United States Patent Office 3,610,134
Patented Oct. 5, 1971

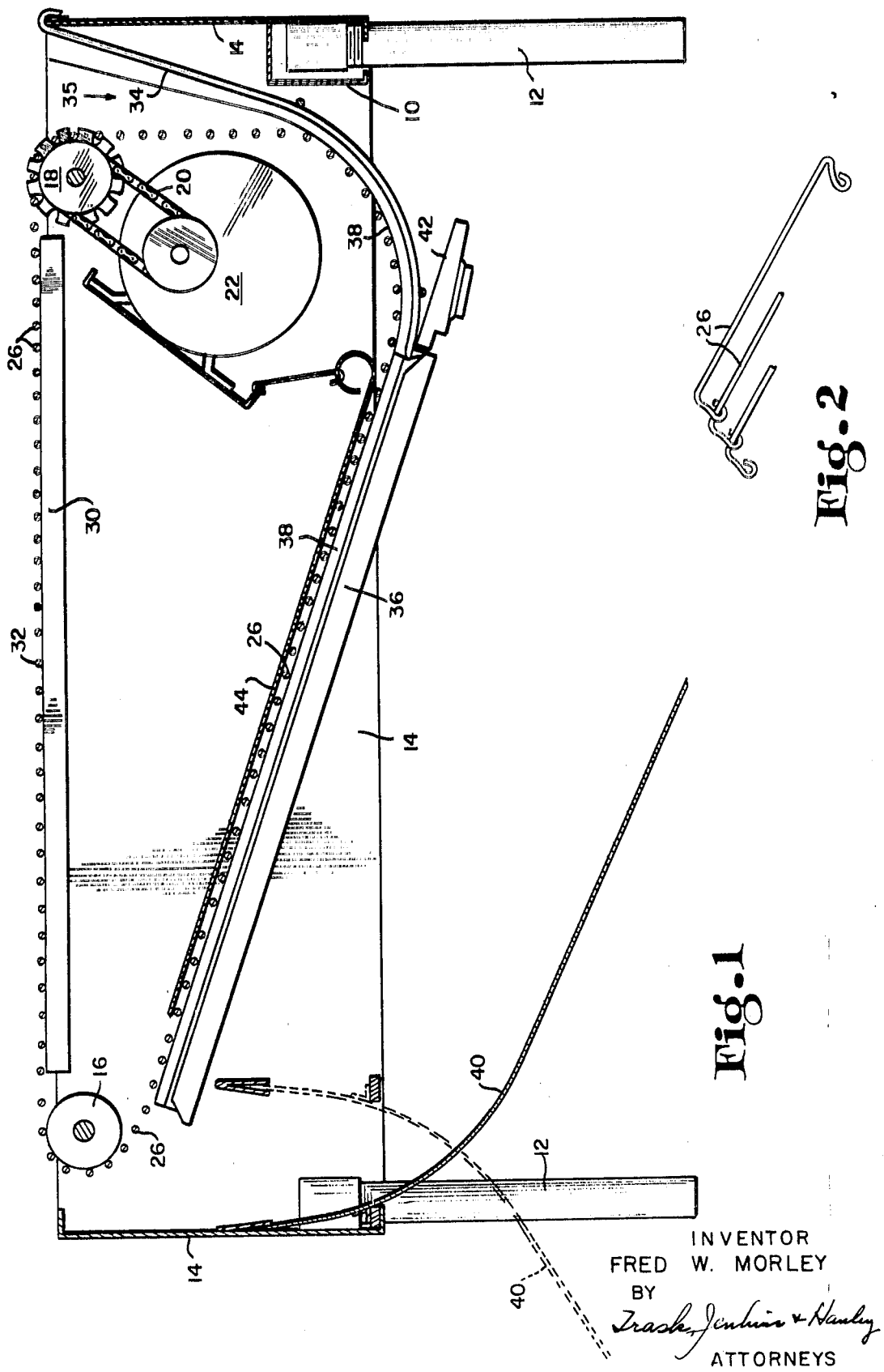

3,610,134
AUTOMATIC BUN GRILL
Fred W. Morley, % Rotomation, Inc., 1450 N. Pershing, Indianapolis, Ind. 46222
Filed May 15, 1970, Ser. No. 37,743
Int. Cl. A47j 37/08
U.S. Cl. 99—352             3 Claims

ABSTRACT OF THE DISCLOSURE

An automatic bun grill. A heavy chain conveyor belt formed of linked transverse rods runs continuously in a horizontal stretch to form a loading station where bun halves are deposited face up, then over a roller and in a depending stretch spaced from a slide, where the buns are caught there-between, then in an inclined return stretch over a coated grill plate, where the heavy chain presses the buns against, and conveys them across the grill, which toasts them. At the end of the grill the toasted buns drop away from the chain onto a slide which deposits them either beneath or beyond the belt area.

SUMMARY OF THE INVENTION

This invention provides an automatic grill especially adapted for toasting sandwich bun halves. The grill can run continuously and will toast buns to a uniform doneness, in such numbers as they are loaded.

A wide chain link conveyor belt is stretched over two end rollers to form top and bottom stretches, the top stretch is supported to form a horizontal loading stretch. The bottom stretch is slack, and runs loosely over an upward sloping grill plate coated with a non-stick coating such as of "Teflon" plastic. At the end of the loading stretch the chain travels downward opposite a slide to form a chute into which the buns are dropped and which carries them to the grill plate. The weight of the chain against the buns on the grill plate serves both to grip the buns to convey them along the plate and also to press them into good heating contact with the plate. At the end of the plate the chain is exposed to allow the buns to drop to a delivery slide.

THE DRAWING

The accompanying drawing illustrates the invention and shows a preferred embodiment. In such drawing:

FIG. 1 is a side elevation of a bun grill in accordance with the invention with its front side wall removed to expose the operating parts; and FIG. 2 is a fragmental section showing how the conveyor chain rods are linked together at their ends.

THE EMBODIMENT SHOWN

The grill shown in the drawing comprises a frame 10 mounted on legs 12 and having side and end walls 14. The frame supports an idler roll 16 and a driven roll 18 connected by a chain 20 or other drive to a motor and gear reduction unit 22. A wide chain link conveyor belt 24 extends about the rolls 16 and 18 and is formed of loosely linked rods 26 in openly spaced relation.

A plate 30 supports the top stretch 32 of the chain in a horizontal plane to form a loading area. At the end of such area the chain runs over the driven roll 18 and drops downward opposite a slide 34 formed of rods and sloped to converge with the belt and define a chute 35. The bottom of the slide 34 is curved to lead to the lower end of an upwardly inclined grill plate 36. Guides 38 at the sides of the belt prevent the belt from riding on the grill plate but space it close enough to the grill plate that it will grip a bun half on the plate to convey it over, and press it against the grill plate.

At the upper end of the grill plate 36, the belt is exposed to form a delivery opening which allows the buns to drop. A delivery slide 40 is placed to receive the toasted buns and deliver them to a receiving station. The slide 40 is desirably reversible between the position shown in full lines and that shown in dotted lines, to deliver the buns either beneath the grill or beyond its end.

The grill plate 36 is desirably coated with a non-stick coating such as that commonly used on cooking pans and the like and sold under the trademark "Teflon." The grill plate may be maintained at a suitable temperature by a conventional automatic control shown as probe-type connector 42.

If desired, a pressure plate 44 may be mounted to rest against the top face of the chain belt as it traverses the grill plate to increase the pressure with which the bun halves are held against the grill plate.

In use, the automatic grill may be kept in continuous operation as buns are needed. Their halves are laid face up on the top stretch of the chain belt which conveys them over the driven roll 18 and into the chute 35 and thence to the grill 34. Here the weight of the chain against the buns, and its flexibility causes the belt to grip the buns sufficiently to convey them upward across the grill and to press them against its grill plate surface to toast them. At the end of the grill they are dropped to the delivery slide 40.

Since the grill plate 36 will be maintained at constant temperature and the chain driven at constant speed, all buns will be toasted uniformly regardless of the rate at which buns are laid on the loading stretch.

I claim:

1. An automatic toaster, comprising a chain link conveyor belt having a top stretch forming a loading area, a depending stretch positioned opposite a guiding wall to form a chute to which the buns are carried, and a return stretch, a grill plate over which the return stretch extends in bun conveying relation therewith, the chain being sufficiently slack in such return stretch to engage buns resting on the grill plate and thereby grip and convey them across the plate, the chain being arranged to travel beyond the end of the grill plate to drop toasted buns therefrom at a delivery point.

2. An automatic toaster as in claim 1 in which the grill plate is inclined upward from the bottom of said chute to the delivery point.

3. An automatic toaster as in claim 1 with the addition of a pressure plate overlying the return stretch to press it against buns on the grill plate.

References Cited

UNITED STATES PATENTS

| | | | |
|---|---|---|---|
| 1,377,088 | 5/1921 | Martin | 198—172 |
| 2,225,068 | 12/1940 | Marriott | 99—386 |
| 3,371,595 | 3/1968 | Peters | 99—386 |

RICHARD E. AEGERTER, Primary Examiner

U.S. Cl. X.R.

99—386, 443 C; 198—33, 160